(Model.) 2 Sheets—Sheet 1.
E. N. BARBER.
LUMBER MEASURE.
No. 332,864. Patented Dec. 22, 1885.
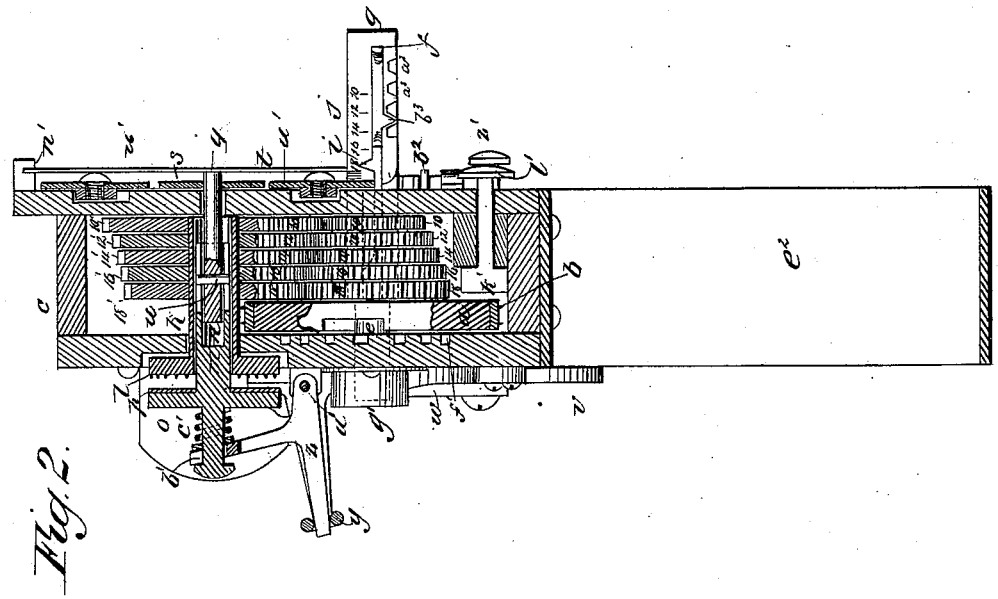
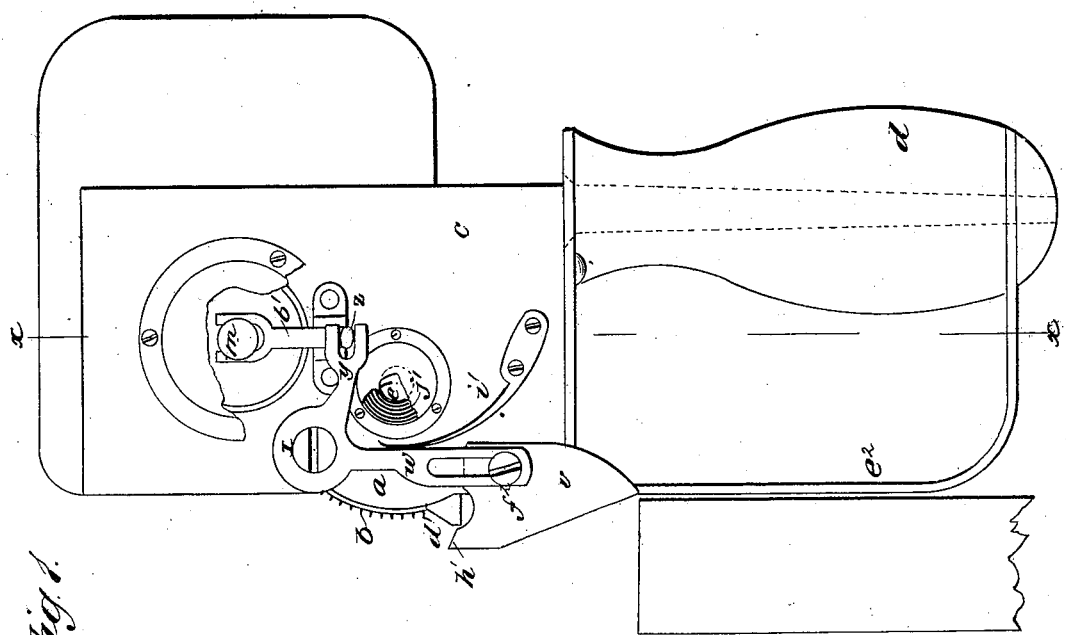
WITNESSES:
Francis McArdle
C. Sedgwick
INVENTOR:
E. N. Barber
BY Munn & Co
ATTORNEYS.

(Model.)

2 Sheets—Sheet 2.

E. N. BARBER.
LUMBER MEASURE.

No. 332,864.

Patented Dec. 22, 1885.

WITNESSES:
Francis McArdle
C. Sedgwick

INVENTOR:
E. N. Barber
BY Munn & Co
ATTORNEYS.

UNITED STATES PATENT OFFICE.

EMMET N. BARBER, OF KENT, OHIO.

LUMBER-MEASURE.

SPECIFICATION forming part of Letters Patent No. 332,864, dated December 22, 1885.

Application filed April 10, 1883. Serial No. 91,220. (Model.)

*To all whom it may concern:*

Be it known that I, EMMET N. BARBER, of Kent, in the county of Portage and State of Ohio, have invented a new and Improved Lumber-Measurer, of which the following is a full, clear, and exact description.

The object of my invention is to contrive a simpler and better arrangement of apparatus than any now in use, that may be readily set for boards of different lengths and rolled across the boards to measure them, and register the measure with accuracy and more rapidly, and especially to make different registrations of different grades of lumber, the said apparatus being constructed and arranged as hereinafter described.

Reference is to be had to the accompanying drawings, forming part of this specification, in which similar letters of reference indicate corresponding parts in all the figures.

Figure 4:
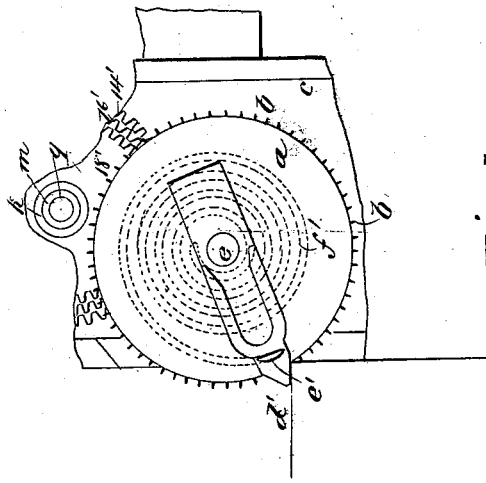
Figure 5:
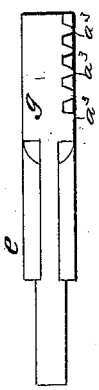
Figure 6:
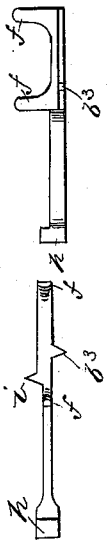
Figure 3:
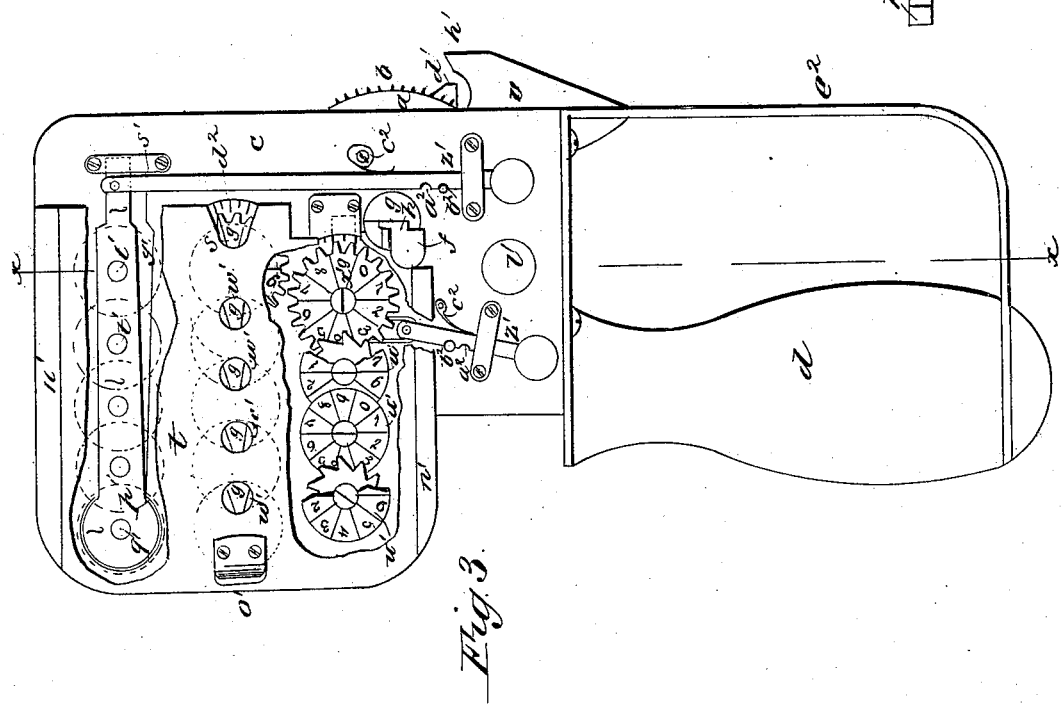

Figure 1 is a side elevation of my improved instrument or apparatus. Fig. 2 is a sectional elevation on line $x\ x$ of Figs. 1 and 3. Fig. 3 is an elevation of the apparatus in reverse of Fig. 1, and with some of the parts broken out. Fig. 4 is a detail in side elevation, the side of the cover or case being removed. Fig. 5 is a plan view of the shaft, and Fig. 6 is a plan and side elevation of the key for connecting the wheels to the shaft.

I propose to employ a main driving-wheel, $a$, having small points $b$ on its rim, in any suitable case, $c$, to which a suitable handle, $d$, is applied to manipulate the instrument for actuating the registering mechanism by being held in contact with the board to be measured for being rotated by drawing the machine across the board to rotate the shaft $e$, to which the driving-wheel is secured. On the same shaft $e$ with the driving-wheel $a$ I have arranged a series of loose changeable-speed gear-wheels, 10, 12, 14, 16, and 18, the numbers corresponding to the lengths of the boards which the wheels are to measure, respectively, with which a sliding key, $h$, with thumb-bit $f$, is arranged on a projecting end, $g$, of shaft $e$ to interchangeably gear any one with the shaft $e$ by said key $h$, leaving the others loose, and which may be set by the pointer $i$ and gage $j$ for connecting the desired wheel. The extension $g$ of shaft $e$ has notches $a^3$, and the key has a bit, $b^3$, which springs into said notches to hold the key in the respective positions for the wheels. The thumb-bit $f$ of the key is a two-pronged device, between which prongs the thumb works to push it forward and backward, and also to spring stud $b^3$ out of the notches $a^3$. This series of changeable-speed gear-wheels connects with another series of wheels, 10' 12' 14' 16' 18', all of which are fast on the hollow shaft $k$. Thus the hollow shaft $k$ will be made to rotate by whichever wheel is keyed to main shaft $e$ by the sliding key $h\ f$. These wheels are so proportioned that when the hollow shaft $k$ has made one revolution the machine will have passed or the main wheel $a$ will have rolled over a board or space just wide enough to contain ten square feet, said board being the length denoted by the number of the wheel connected with the shaft $e$ at the time. Thus, if wheel 10 be secured to the shaft $e$ while the hollow shaft $k$ makes a revolution, the driving-wheel $a$ passes over a space which, if ten feet long, contains ten square feet, or with wheel 18 fast it passes over a space which, if eighteen feet long, contains ten square feet, and the registering attachment records ten for each revolution of shaft $k$.

To secure accuracy in the registering mechanism, which is driven by the hollow shaft $k$, the following contrivance is employed to automatically throw it in gear before the driver $a$ begins to rotate, and out of gear as soon as a certain point in the machine comes to the other edge of the board:

On one end of the hollow shaft $k$ is secured a wheel, $l$, on the disk of which are short sharp points. Within the shaft $k$ is fitted another shaft, $m$, also hollow at one end—that is to say, having a socket, $n$—to which shaft is secured a disk, $o$, opposite to the points of disk $l$, and being covered with leather $p$. Within the socket $n$ is fitted another shaft, $q$, to one end of which is secured the small main register-dial $s$, behind or under cover $t$. The shafts $m$ and $q$ are connected together, so that both must rotate at once, but allowing a lateral movement to shaft $m$ by means of the pin $u$, fast in shaft $q$, but moving at the ends in slots of shaft $m$. It will be seen that when the disks $l$ and $o$ are brought together the points of disk $l$ engage with the soft leather $p$, so that all, including dial $s$, must rotate together with shaft $k$, and that when the disks $l$ and $o$ are separated the rotating of the shaft $k$ and disk $l$ will not move the other parts communicating motion to the dial. As the machine is drawn across the board, the piece $v$, attached to the end of lever $w$, is pressed up. The lever $w$ being pivoted at $x$, the end of said lever is pushed forward, moving another lever, $z$, on its pivot $a'$, and pressing end $b'$ against spiral spring $c'$ around shaft $m$, which pushes the disks together and connects the registering-dials with the measuring-wheels. The machine being drawn across the board, the driver $a$ is given a positive start at the same point each time by means of the projecting end of a slide, $d'$, arranged in a groove in one side of the main wheel $a$, and having a stud, $e'$, on one of its sides, projecting into a spiral groove, $f'$, upon the inside of the case, said groove being shown in cross-section, Fig. 2, and by dotted lines in Fig. 4. As the driver $a$ rotates, the slide $d'$ is drawn nearer to the center of the driver, so that it will retire and not interfere when the driver completes its revolutions, and the slot is coiled around the shaft of the driver several times, so that the rotation of the driver will not be interrupted by the stud $e'$ during the number of turns required for the widest board.

The machine begins measuring when the point $h'$ of the piece $v$ on the lever $w$ comes to the first edge of the board, and is thrown out of gear or ceases to measure when the same point, $h'$, drops off at the opposite side of the board or is thrown off by the spring $i'$, which action separates the disks $l$ $o$ and stops the recording-dials.

When the driver $a$ is released from contact with the board, it is brought back to the starting-point by the action of a coiled spring, $j'$, one end of which is made fast to the shaft $e$ and the other to the cover $g'$, which is secured to the case $c$. This back action is stopped at the right point by the return of the projecting stud $e'$ of slide $d'$ to the end of the spiral groove $f'$. The strain of the spring $j'$ is delivered on the stud $e'$ and the end of the groove, leaving the differential wheels with no strain, thus allowing a free movement of the sliding key $h$ in changing the gears from one length of the boards to another, for which purpose the return to the starting-point is necessary. This back action is to be regulated by a brake, $k'$, having a thumb-bit, $l'$, outside of the case, for pressing the brake against the side of the wheel $a$.

In Fig. 3 the registering-dials are shown, including a device for registering two different grades separately from the whole amount, from which the amount of the two grades being taken the amount of a third grade is ascertained. In grooves of the case and under the cover $t$, which slides in guides $n'$, and having a handle, $o'$, for operating it, is a bar, $p'$, pivoted at $q'$, the other end being free to move a short distance and controlled by a cleat, $s'$. To this bar is pivoted or otherwise secured by screws or stud-pivots at $t'$ a series of small dials, shown dotted and similar to another series, $u'$, attached to another similar bar, $p'$, at the corresponding position on the opposite side of the center of the machine. The main series of dials in the center, or between these two series, is only seen (as are the others in the complete machine) through the openings in the cover at $w'$, which are for the purpose of reading the numbers registered.

The main dial $s$ of the middle series and the main dials $x'$ and $y'$ of the other two series of dials are figured alike for the unit-dials of a series, and they are also toothed, so that either of the side registers may be worked by the shaft $q$, according as the levers $p'$ are shifted by the bars $z'$ to connect or disconnect said side series with the said shaft $q$ by the main dial, which may easily be done at any time with the thumb of the left hand, in which the instrument is to be held for use, by pressing on the knobs of the said bars, which have notches $a^2$ to engage with studs $b^2$, and are provided with springs $c^2$ to keep them in connection with said bars.

The arrangement of the respective series of dials is the same as commonly adapted in registering mechanism and need not therefore be described.

When the lumber to be measured is all one grade, only the middle series of registering-dials will be used, both of the other series being disconnected, but when inspecting and grading a cargo of lumber the whole amount measured is registering on the main series of dials, as is all of the first quality; but whenever a piece of, say, the second quality is to be measured one of the other series of registering-dials—say the one next to the handle—will be put in gear to register the measure also, and for third-quality lumber the record will be similarly made on the other side series, the second-quality series being disconnected. Then when the whole has been measured the amount of the first quality will be known by deducting the sum of the second and third quality from the middle record.

This machine is constructed to be held in the left hand and at the same time to be enabled to work the thumb-bit $f$ of the key $h$, the brake-bit $l'$, and the levers $z'$ by the thumb of said hand; but it may of course be so applied as to hold it in the right hand.

$e^2$ is a guard by which to protect the knuckles from contact with the board.

It is to be understood that the spiral spring $c'$ is employed in connection with disk $o$ and lever $b'$, to cushion the lever $b'$ and prevent the too positive contact of the leather $p$ with the points of wheel $a$.

The piece $v$ at the end of the lever $w$ is made adjustable by the set-screw $f^2$, so that the machine may be adjusted for measuring flooring, for which the said piece is to be shifted the width of the tongue nearer to the center of the lever.

This improved machine is more exact in operation, and the device by which different grades may be separately registered renders it especially useful for lumber dealers.

Having thus described my invention, I claim as new and desire to secure by Letters Patent—

1. The combination, in a lumber-measuring machine, of the main wheel $a$, projecting through the lower face of the casing and having its periphery provided with engaging points, with the series of changeable-speed gear-wheels mounted on the shaft of the main wheel, a second series of changeable-speed gears meshing with the first-named series, and a register operated from said gearing, substantially as set forth.

2. The combination, in a lumber-measuring machine, of the main wheel $a$, the two series of changeable-speed wheels for actuating the registering mechanism and registering mechanism connected therewith, the shaft of said registering mechanism having a disconnecting device to allow the main wheel and driving-gears to return to the zero-point independently of the said registering mechanism, substantially as described.

3. The combination, in a lumber-measuring machine, of the main wheel $a$, the two series of changeable-speed wheels, and registering mechanism, said registering mechanism being coupled with said changeable-speed wheels by a connecting and disconnecting clutch, and the driving-wheel $a$, having a retracting-spring, $j'$, to return it to the starting-point independently of the registering mechanism, substantially as described.

4. The combination, in a lumber-measuring machine, of a main driving-wheel, $a$, two series of changeable-speed wheels, and a registering mechanism, said registering mechanism being geared with said wheels by a clutch device having means for automatically connecting it when the machine is applied to the lumber, substantially as described.

5. The combination, in a lumber-measuring machine, of the piece $v$ and levers $w$ and $z$ with the clutch device that connects the registering mechanism with the driving-gear, the said piece $v$ being actuated by contact with the lumber when the machine is applied thereto, substantially as described.

6. The combination, with a lumber-registering machine and the automatic mechanism for connecting and disconnecting its drive-wheel with and from the registering mechanism of a piece, as at $v$, connected to the said connecting mechanism and projecting below the lower face of the casing adjacent to the said drive-wheel, substantially as set forth, whereby, when drawn across a board the said piece $v$ will automatically cause the disengagement of the clutch and registering mechanism the instant the said piece passes over the rear edge of the measured board.

7. The combination, in the lumber-registering machine, with the clutch mechanism and the main drive-wheel $a$, constructed to be connected with the registering mechanism by said clutch, of the longitudinally-adjustable piece $v$, mounted on the pivoted lever $w$ of the said clutch mechanism and extending below the lower surface of the machine, adjacent to the drive-wheel $a$, whereby the said piece may be adjusted toward the pivot of the lever $w$ in the measurment of flooring, &c., substantially as set forth.

8. In a lumber measuring-machine, the combination of the main drive-wheel $a$, projecting through the lower face of the casing, with the starter $d'$, connected to and rotating with the drive-wheel, the said starter being arranged with its vertical edge at the front part of that portion of the wheel projecting through the casing, whereby when the measurer is being drawn across the board the starter $d'$ will strike the edge of the board and positively start the drive-wheel at that point, substantially as set forth.

9. The starting-slide $d'$, arranged in a groove in the face of the main wheel $a$, and having a stud or projection, $e'$, engaged with the spiral groove $f'$ of the case to retire said slide, substantially as described.

10. The combination, with main shaft, of the spring $j'$, for returning the same to its normal position, the main or drive wheel $a$, two series of interchangeable differential wheels, and a registering mechanism geared with said wheels by a disconnecting-clutch, substantially as described.

11. The combination, with the main wheel $a$ and two series of changeable-speed wheels, of the connecting device for the registering mechanism, consisting of the hollow shaft $k$, and point-disk $l$, socket-shaft $m$, and leather-faced disk $o$, and the shaft $q$, said shaft being coupled to the socket-shaft by a pin and slots, one of the sets of wheels being secured to the hollow shaft, and the shifting levers being connected to the shaft $m$, substantially as described.

12. The combination of lever $z$, spring $c'$, leather-faced disk $o$, point-faced disk $l$, and the shafts $k$ $m$, substantially as described.

13. The combination, in a lumber-measuring machine, of the main driving-wheel $a$, two series of differential wheels, a disconnecting-clutch device for the registering mechanism, retracting-spring $j'$, and the brake $k'$ $l'$, substantially as described.

14. The combination, with the registering mechanism of a lumber-measuring machine, of a supplemental register adjustably secured to the machine adjacent to the main register and constructed to be thrown into and out of engagement therewith, substantially as set forth, whereby lumber of different grades may be measured in the manner herein set forth.

15. The auxiliary series of registering-dials arranged on a pivoted bar, $p'$, and provided with a shifting-bar, $z'$, in combination with the main registering apparatus to connect and disconnect therewith, substantially as described.

16. The combination of guard $e^2$ with the handle $d$ of the lumber-measuring machine, the horizontal part of the said guard being secured below the handle in the plane of the lower face of the casing, substantially as described.

EMMET N. BARBER.

Witnesses:
 FRED GORDON,
 FRANK M. BARBER.